(12) United States Patent  
De Leeuw

(10) Patent No.: US 7,681,588 B2
(45) Date of Patent: Mar. 23, 2010

(54) PRESSURE REGULATOR

(75) Inventor: Victor De Leeuw, Hilvarenbeek (NL)

(73) Assignee: Nordson Corporation, Westlake, OH (US)

( * ) Notice: Subject to any disclaimer, the term of this patent is extended or adjusted under 35 U.S.C. 154(b) by 430 days.

(21) Appl. No.: 10/564,463

(22) PCT Filed: Jul. 6, 2004

(86) PCT No.: PCT/EP2004/051367

§ 371 (c)(1),
(2), (4) Date: Aug. 16, 2006

(87) PCT Pub. No.: WO2005/005059

PCT Pub. Date: Jan. 20, 2005

(65) Prior Publication Data

US 2007/0039651 A1    Feb. 22, 2007

(30) Foreign Application Priority Data

Jul. 14, 2003   (DE)  ............................ 203 10 832 U

(51) Int. Cl.
*G05D 16/10*   (2006.01)

(52) U.S. Cl. ............. 137/495; 137/505.18; 137/505.42; 137/556.3

(58) Field of Classification Search ............ 137/505.15, 137/505.18, 505.42, 556.3, 906, 494, 495

See application file for complete search history.

(56) References Cited

U.S. PATENT DOCUMENTS 159,732 A * 2/1875 Wiesebrock ........... 137/505.18

(Continued)

FOREIGN PATENT DOCUMENTS

DE    8904692    5/1989

(Continued)

*Primary Examiner*—Stephen Hepperle
(74) *Attorney, Agent, or Firm*—Wood, Herron & Evans, L.L.P.

(57) ABSTRACT

Pressure regulator with partial volumes for regulating the operating pressure of fluids, in particular adhesives, at the inlet of a consuming device, the first partial volume (14) being connectable to a fluid source and the second partial volume (24) being connectable to the fluid inlet of the consuming device, wherein the second partial volume (24) has a cylindrical section(24a) of variable size, a connecting channel (22) connecting the first (14) and the second (24) partial volumes, a valve disposed in the first partial volume for opening and closing the connecting channel, said valve having an insert (23) and a movable sealing piston (32), the front end of which forms a sealing body (34) for closing the connecting channel and the rear end of which is sealed against the first partial volume. A working piston (54) is disposed in the cylindrical section (24a) for changing the volume thereof, with a front end (59) facing the cylindrical section and the sealing piston, and with a piston rod (56) for moving the sealing piston, said piston rod (56) engaging the front end (59) of the sealing piston and forming an endstop for same. The rear end of the sealing piston and the front end of the working piston are exposed to the pressure of the fluid in the second partial volume (24) while a movable adjuster piston (92) is provided to which compressed air can be applied and which is coupled to the endstop that determines the extent to which the valve opens between its closed and its open positions.

20 Claims, 4 Drawing Sheets

U.S. PATENT DOCUMENTS

Figure 1:
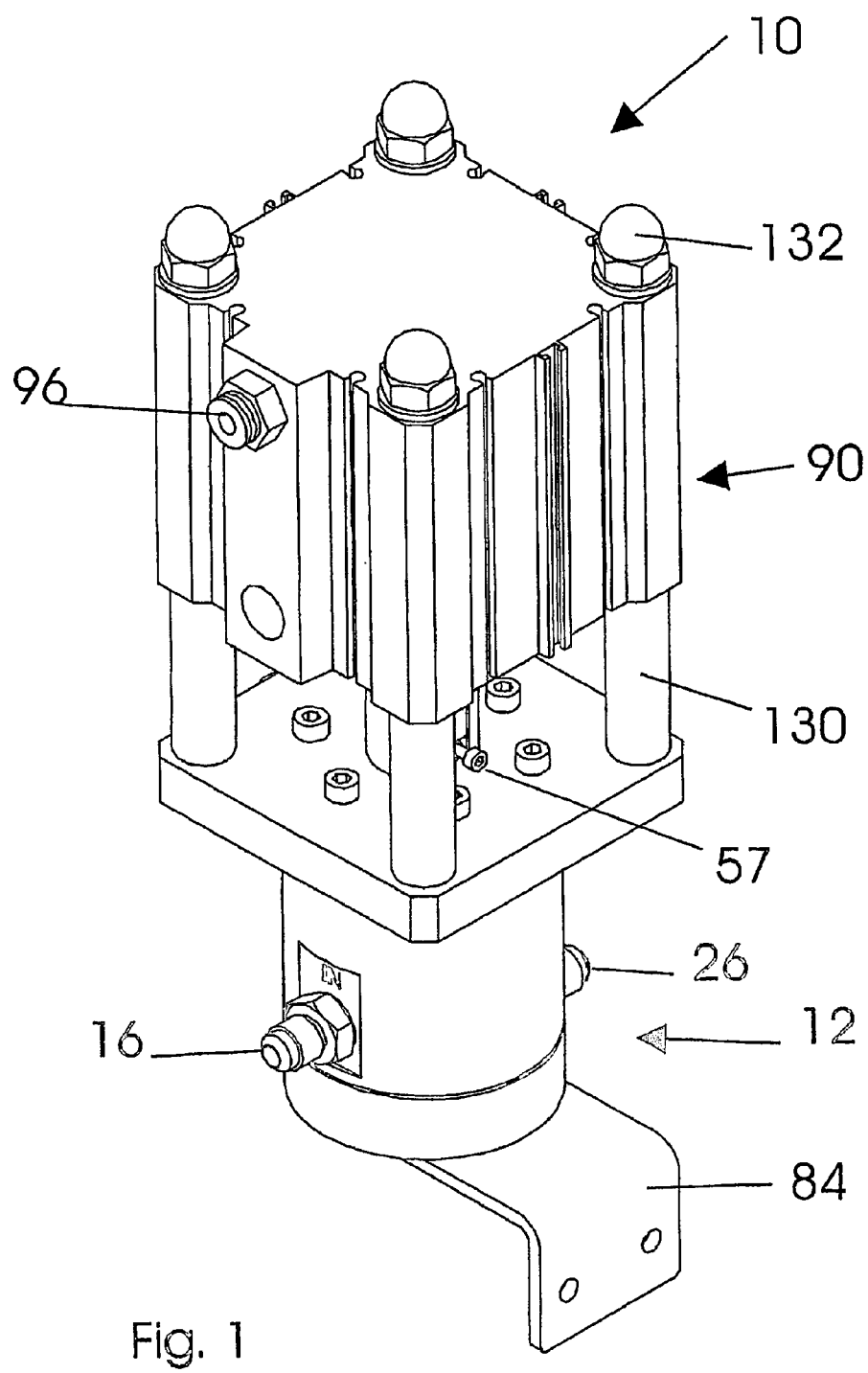

| | | | | |
|---|---|---|---|---|
| 251,726 A | * | 1/1882 | Mueller et al. | 137/505.18 |
| 479,553 A | * | 7/1892 | Cabell | 137/505.4 |
| 942,042 A | * | 11/1909 | Petley | 137/465 |
| 2,105,681 A | * | 1/1938 | Armstrong | 137/495 |
| 2,602,467 A | * | 7/1952 | Griswold | 251/61.2 |
| 3,643,683 A | * | 2/1972 | Semon | 137/484.8 |
| 4,445,532 A | * | 5/1984 | Mitchell | 137/495 |
| 5,159,952 A | * | 11/1992 | Ono | 137/505.41 |
| 5,234,026 A | * | 8/1993 | Patterson | 137/505.18 |
| 5,312,016 A | | 5/1994 | Brennan et al. | 222/55 |
| 5,406,975 A | * | 4/1995 | Nakamichi et al. | 137/495 |
| 5,497,803 A | * | 3/1996 | Ferrante | 137/505.42 |
| 5,810,041 A | * | 9/1998 | Garofalo | 137/81.2 |
| 6,199,582 B1 | * | 3/2001 | Matsuzawa et al. | 137/503 |
| 6,329,013 B1 | | 12/2001 | Putt | 427/8 |
| 2002/0170601 A1 | * | 11/2002 | Smith | 137/505.42 |

FOREIGN PATENT DOCUMENTS

EP　　　　0509323　　　10/1992

* cited by examiner

PRESSURE REGULATOR

The invention relates to a pressure regulator with two partial volumes for regulating the operating pressure of fluids, in particular adhesive, at the inlet of a consuming device.

When cold glue, for example, is to be dispensed onto a substrate, a glue pump which conveys the glue with a certain pressure to one or more dispenser heads is generally used in industrial production. The dispenser heads are controlled pneumatically or electrically and dispense cold glue as determined by the control system. When the glue is being dispensed, the substrate is usually moved relative to the dispenser head. Depending on the speed of such movement, a predefinable amount of cold glue must be dispensed from the dispenser head in order to produce a specified layer thickness of cold glue on the substrate. If the speed changes during application, or if application of the glue is interrupted, a valve in the dispenser head must be closed, or the valve opening must be reduced. This usually means that the piping system for the cold glue remains under the high pressure level required for dispensing the glue before the speed was reduced or movement was stopped. When restarting the plant, for example after a new substrate has been inserted, it has been difficult until now to avoid an excessive amount of glue from being dispensed as a result of the high pressure. This could be detrimental to the quality of the glued bond and/or disadvantageous for the quality of the glued substrate's appearance. This has been counteracted until now by opening a shutoff valve after the plant has been closed down, as a result of which any excess pressure was reduced and any surplus cold glue was drained off from the system. This method was found dissatisfactory in the long run.

The object of the invention is therefore to provide a pressure regulator, in particular for the cases described, by means of which peak pressures in the fluid being dispensed are largely avoided, without loss of fluid, when the device consuming the fluid is shut off, while also ensuring that an amount of fluid optimally adjusted to requirements is available when the consuming device is restarted.

This object is achieved in a pressure regulator pursuant to the generic part of claim 1 using the means described in the characterizing portion of the claim.

Preferred embodiments are described in the subclaims.

Tests with the pressure regulator according to the invention have shown that it entirely fulfills the expectations placed in it. It should be noted in this regard that the pressure regulator according to the invention is relatively inexpensive to produce, because its adjuster portion can be a pneumatic device commonly available on the market.

Figure 2:
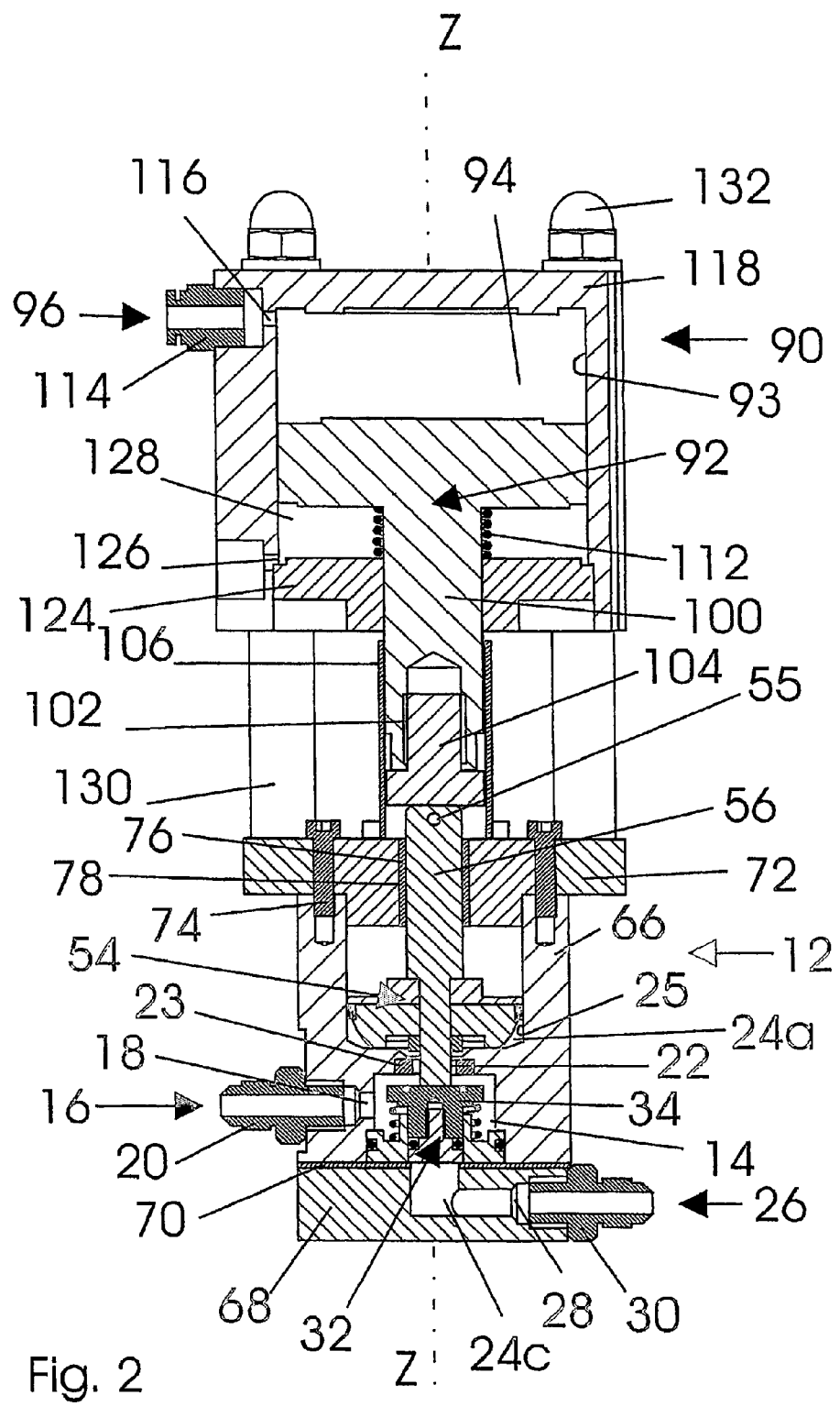
Figure 3:
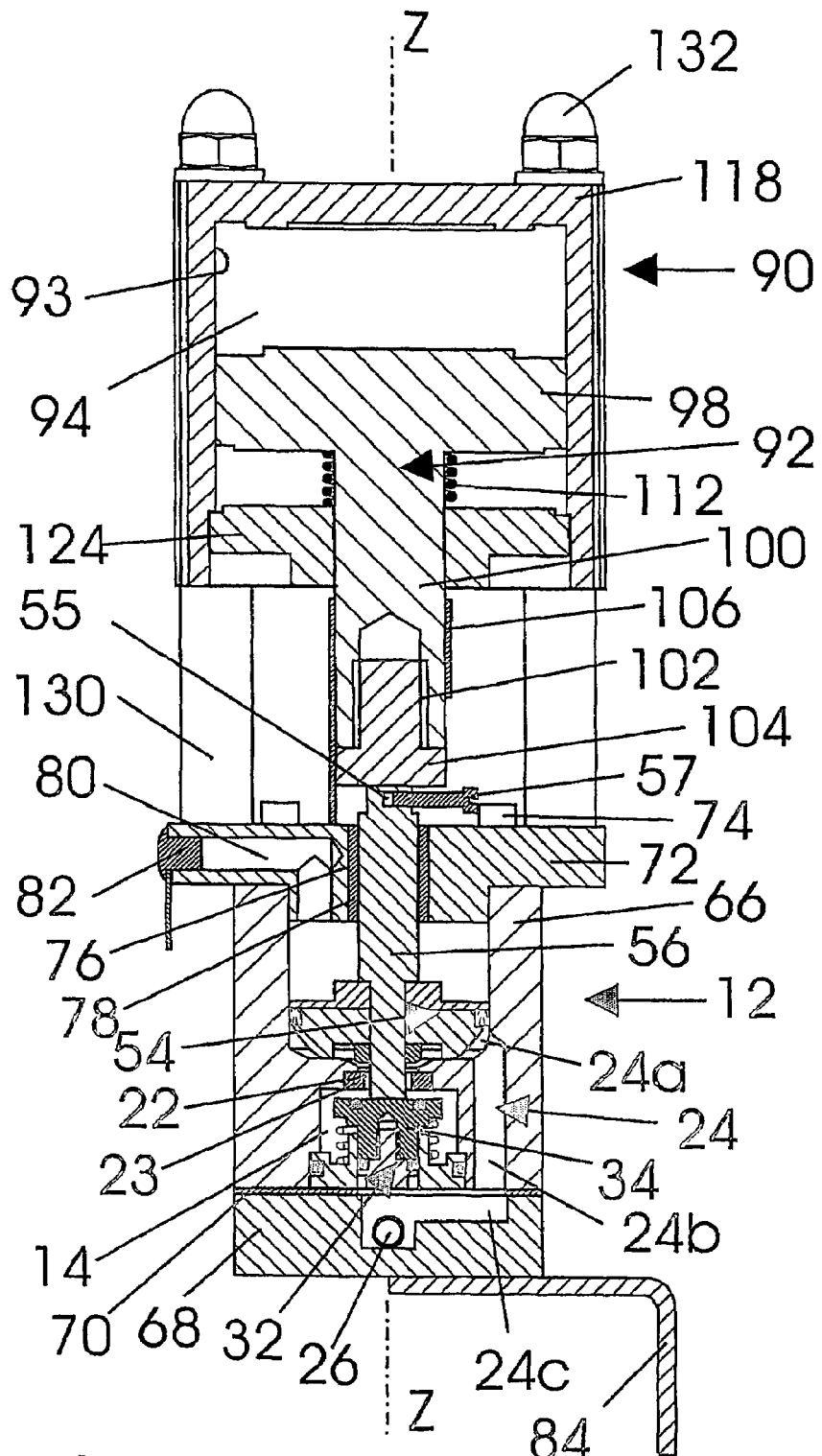
Figure 4:
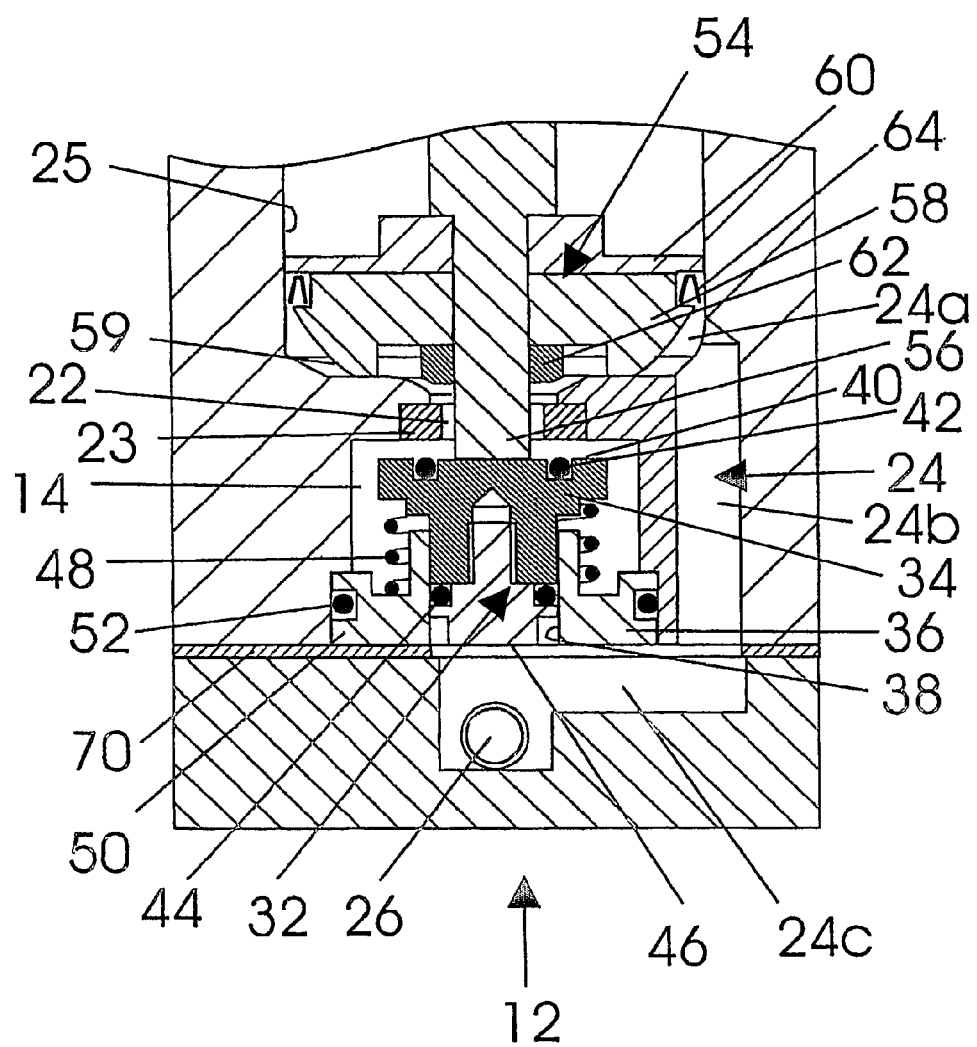

The invention shall now be described in greater detail with reference to the embodiment shown in the drawings, which show:

FIG. 1 a pressure regulator in a perspective view,

FIG. 2 a pressure regulator in a cross-sectional view,

FIG. 3 a pressure regulator in a cross-sectional view, in which the sectional plane is rotated 90° about the normal axis Z-Z in FIG. 2, and FIG. 4 an enlarged view of a section of FIG. 3.

The pressure regulator 10 can be used to regulate the pressure of different kinds of fluid, such as cold glue, hot-melt adhesives and other fluids; in the following, it is described with reference to the regulation of cold glue pressure.

As shown in FIG. 1, the pressure regulator 10 is mainly comprised of a regulator portion 12 and an adjuster portion 90 disposed along a common axis Z-Z (FIG. 2). The regulator portion 12 has a fluid inlet 16 and a fluid outlet 26 for liquid cold glue or a similar fluid, and can be mounted with the help of an angle bracket 84. The adjuster portion 90 disposed above the regulator portion 12 can be supplied with compressed air from a compressed air supply connection 96.

As shown in FIG. 2, the pressure regulator 10 has a first partial volume 14 connected in the regulator portion 12 to a fluid inlet 16, and a second partial volume 24 connected to the fluid outlet 26. The second partial volume 24 comprises a cylindrical section 24a, a channel 24b and an outlet portion 24c. The fluid inlet 16 is formed by an inlet hole 18 and an inlet connection member 20, and the fluid outlet 26 is formed by an outlet hole 28 and an outlet connection member 26. A connecting channel 22 leads from the first partial volume 14 to the second partial volume 24.

FIG. 4 shows an enlarged view of a section of the regulator portion 12 around the first and second partial volume 14/24. In the first partial volume 14, a two-part sealing piston 32 with a sealing body 34 and a guide member 36 is movably disposed in a cylindrical valve guide 38. The sealing body 34 has a sealing surface 40 incorporating a sealing ring 42. The rear side of the guide member 36 is inserted into the sealing body 34. A guide sealing ring 44 is provided between the sealing body 34 and the guide member 36. The rear side 46 of the guide member 36 faces the second partial volume 24, to the pressure of which it is exposed. Dead zones are avoided due to the valve guide 38 being configured such that it is open to the second partial volume. The sealing body 34 is weakly biased in the direction of closure by a valve spring 48.

The first partial volume 14 is isolated at the bottom from the second partial volume 24 by an intermediate base 50 and sealed by a base sealing ring 52.

The connecting channel 22 passes through a ceramic insert 23 that is disposed opposite the sealing ring 42, with which it forms a valve.

A working piston 54 is displaceably disposed inside a cylinder 25 along axis Z-Z (FIG. 2) and confines the second partial volume 24 at the end facing away from its fluid outlet 26. A piston rod 56 passes through working piston 54, extends through the connecting channel 22 and can rest upon the sealing surface 40 of the sealing body 34. The working piston 54 also has a front and a rear piston disk 58 and 60, which are fastened to the working piston 54 with the help of a locking nut 62. A circumferential lip seal 64 for sealing the working piston against the wall of cylinder 25 is provided between the front and the rear piston disks 58 and 60.

FIG. 2 shows the overall constructional design of the regulator portion 12. The first partial volume 14 and the second partial volume 24 are substantially formed in a regulator housing 66. The regulator housing 66 is dosed off at the bottom by a regulator base 68, which is attached to the regulator housing 66 along with an intermediate seal 70. The upper end of the regulator housing 66 is formed by cover plate 72 that is screw-fastened to the regulator housing 66 with six hexagon socket screws 74. The cover plate 72 is provided with a through bore 76 for guiding the working piston 54 via the rear portion of piston rod 56, said through bore having a sliding bearing 78.

At the rearward end of the piston rod, running perpendicular to the Z-Z axis, there is a threaded hole 55 into which an indicator screw 57 is fastened, as can be seen from FIG. 3. The indicator screw 57 is movably disposed in a slot in the cylinder jacket 106 and, according to FIG. 1, can be seen from the outside such that the position of the working piston 54 can be read from it. It can also be seen whether any air bubbles are present in the system. It can likewise be seen in FIG. 3 that cylinder 25 has a pressure compensation hole 80 with a protective flap 82 at the back of working piston 54, said cap serving as protection during transport. By means of pressure compensation hole 80, cylinder 25 of the regulator portion 12 is supplied with lubricant when the regulator is commissioned.

According to FIG. 2, an adjuster piston 92 is provided inside an adjusting cylinder 93 in the adjuster portion 90, and forms a variable boundary of a pressure chamber 94 into which the compressed air supply connector 96 leads. The adjuster piston 92 has an adjuster piston rod 100 with an axial threaded hole 102 into the front end of which a screw plug 104 is screwed. The adjuster piston 92 can apply force to the working piston 54 via screw plug 104 and piston rod 100. The adjuster piston rod 100 with screw plug 104 is partially surrounded by a cylinder jacket 106. The adjuster piston 92 is weakly biased in the direction of the pressure chamber 94 with the help of a tension spring 112.

The pressure chamber 94 can be supplied with compressed air via a compressed air supply connection 96, which comprises a compressed air connector 114 and a compressed air hole 116. The adjusting cylinder 93 is located in a housing 118. In the direction of the regulator portion 12, housing 118 is closed off by a base 124. In housing 118, above the base 124, a pressure compensation hole 126 is provided to equalize the pressure of chamber 128 between the base 124 and the adjuster piston 92.

The adjuster portion 90 and the regulator portion 12 are joined to each other by stud bolts 130, which are fastened by four cap nuts.

In order to describe the functional operation of the pressure regulator according to the invention, reference is firstly made to FIG. 3, and it is assumed, in contrast to the drawing, that valve 23, 32 is closed. This valve setting is possible if there is no pressure in the pressure chamber 94 and the adjuster piston 92 can therefore move under the biasing force of spring 112 to its upper endstop in housing 118, whereupon the pressure chamber has its smallest volume and because the adjuster piston rod 100 with screw 104 has separated as a result from the piston rod 56 of working piston 54 in regulator portion 12, such that the valve spring 48 raises the working piston 54 a little and the gap between the sealing body 34 and insert 23 is closed due to the bias of valve spring 48.

The raised position of working piston 54 is made externally visible by indicator screw 57.

It can be seen from FIG. 4 that, when the valve is closed, the sealing body 34 with its sealing surface 40 and sealing ring 42 is sealed against the ceramic insert 23. Sealing piston 32 is moved into the closed position and kept in that position by valve spring 48.

If there is no pressure in pressure chamber 94 and cold glue is therefore fed under pressure through fluid inlet 16 (FIG. 2) into the first partial volume 14, with valve 23, 32 in the closed position, the sealing body 34 under the biasing force of valve spring 48 is pressed additionally against the ceramic insert 23 by the pressure of the cold glue. The sealing effect of valve 23, 32 is therefore reinforced. In this closed position of valve 23, 32, the cold glue in the first partial volume 14 does not reach the second partial volume 24, which is therefore under no pressure and free of cold glue when the device is started.

If air at a predefined pressure is now supplied to pressure chamber 94 via compressed air connection 96 in order to commence operation, a regulating force pushing adjuster piston 92 downwards (in the drawing) is produced in the adjusting cylinder 93. This movement and this regulating force are transferred via screw plug 104 to piston rod 56, and also, by moving working piston 54, to the sealing body 34, which opens valve 23, 32 against the force of the valve spring 48 and forms an endstop for the sealing body 34, which determines the size of the gap between the sealing body 34 and the insert 23.

The enlarged sectional view In FIG. 4 shows valve 23, 32 in the open position. When valve 23, 32 is open, the cold glue that is pumped under constant preliminary pressure by a pump (not shown) into the first partial volume 14 proceeds through the gap between the sealing ring 42 and the ceramic insert 23, then on through the connecting channel 22 into the second partial volume 24 and through the fluid outlet 26 to dispenser heads (likewise not shown). The pressure of the cold glue in the first partial volume 14 is therefore effective in the second partial volume 24 as well, and hence also as far as the dispenser heads. The dispenser heads' demand for cold glue is dependent, inter alia, on the feed speed of the substrate onto which the cold glue is dispensed. The amount dispensed is controlled at the dispenser heads by compressed air, for example. Depending on the feed speed of the substrate, a proportional valve supplies compressed air, in this example, to the pressure chamber 94 of adjuster portion 90.

Inside regulator portion 12, and after valve 23, 32 opens, the pressure of the cold glue acts not only on the sealing surface 40 of sealing piston 32, but also on the rear side 46 of the guide member 36 of sealing piston 32. The pressures acting on sealing piston 32 are substantially balanced out. A force acting in the direction of closure results only from the biasing force of valve spring 48; however, the force of the spring is small by comparison. Accordingly, sealing body 34 is pressed with only slight force against the endstop formed by piston rod 56. The aforementioned gap is not reduced to any perceptible degree.

The pressure of the cold glue acts not only on sealing piston 32, but also on the front end 59 of working piston 54 (which faces downwards In the drawing), in particular on the piston disk 58 thereof, and is therefore directed against the regulating force generated by the compressed air in the pressure chamber 94.

If the size of the force acting on working piston 54 due to the pressure of the cold glue in the second partial volume 24 exceeds the regulating force, this leads to movement of the working piston 54 in the upward direction in FIG. 4, and hence of the aforementioned endstop. Consequently, the sealing piston 32 with sealing body 34 also moves in the direction of closure, such that the gap or the escape hole between the sealing ring 42 and the ceramic insert 23 is reduced in size. As a result, the flow of cold glue from the first partial volume 14 into the second partial volume 24 is braked, such that the pressure of the cold glue in the second partial volume 24 cannot be maintained, and is accordingly reduced. What also happens is that movement of the working piston 54 leads to an expansion of the cylindrical section 24a of the second partial volume 24, thus giving additional support to the reduction of pressure in the second partial volume 24.

However, the decrease in the pressure of the cold glue in the second partial volume 24 also leads to a reduction in the force counteracting the regulatory force, said force being produced by the pressure that is also exerted on the front side 59 of the working piston 54. This means that the movement of the working piston 54 is likewise counteracted until there is equilibrium between the regulating force and the force on the working piston 54 generated by the pressure in the second partial volume 24. The pressure of the cold glue in the second partial volume 24 is then proportional to said regulating force.

FIG. 2 illustrates how the regulating force is generated. The cylindrical pressure chamber 94 can be supplied with compressed air via the compressed air connection 96 comprising the compressed air connector 114 and a compressed air hole 116. The adjustment pressure that builds up as a result in pressure chamber 94 thus acts on the adjuster piston head 98 of adjuster piston 92 and leads to a regulating force that acts in the direction of the working piston 54. If said regulating force is equal in strength to the force produced by the pressure in the second partial volume 24 on working piston 54, a state of equilibrium results.

The force of spring 112 is small and of importance only at smaller pressures, particularly in the unpressurized state. In said state of equilibrium, the pressure ratio between the adjustment pressure in the cylindrical pressure chamber 94 and the pressure in the second partial volume 24 is essentially equal to the ratio in areas between the effective surface of the front side 59 of working piston 54 and the effective surface of the adjuster piston head 98 of adjuster piston 92. In the embodiment shown, this ratio is 1:3, so a pressure of one bar in pressure chamber 94 can lead to the cold glue in the second partial volume 24 having a pressure of three bar. The pressure of the cold glue in the second partial volume 24—and hence at the inlet of the dispenser heads—is therefore defined with the help of the pressure in adjusting cylinder 93. By defining an area ratio tailored to the specific case, it is possible to use the pneumatic control pressure of the dispenser heads directly for setting the adjuster portion to a desired pressure in the second partial volume 24.

If the application of cold glue is stopped during the application procedure, or if the volume being dispensed must be greatly reduced, for example in an emergency stop, one reduces the adjustment pressure in the cylindrical pressure chamber 94 (FIG. 2) accordingly. This can involve a reduction from 6 to 1.5 bar, for example. This reduction leads to adjuster piston 92 and likewise working piston 54 with the aforementioned endstop moving in an upward direction in the drawing. The sealing piston 32 with sealing body 34 then follows the endstop in the direction of the closed position.

If the air pressure in the adjusting cylinder is reduced to a sufficiently great extent, the linkage between the first partial volume 14 and the second partial volume 24 is interrupted. In such a case, the pressure of the cold glue in the second partial volume 24 drops likewise. Due to the movement of working piston 54, cylindrical section 24a leads to an increase in the second partial volume 24. In this enlarged space, cold glue that has accumulated in the glue feed tubes leading to the dispenser heads due to the dispensing process being stopped (or braked), and which up to now has been drained off externally using a discharge valve, can be stored for the interim. The consequence of this interim storage is that the pressure of the glue in the system is reduced accordingly, and that, when the dispenser heads are restarted, there is no cold glue at excessive pressure at their fluid inlets.

In order to start dispensing again after dispensing has been Interrupted, the adjustment pressure in pressure chamber 94 (FIG. 2) is increased. This leads to a corresponding increase in the regulating force and hence to a downward movement of the adjuster piston 92 in the drawing, and then of the working piston 54 with the aforementioned endstop. This movement leads at first to the second partial volume 24 in cylindrical section 24a being reduced in size, and hence to an increase in the pressure inside it. The liquid cold glue stored for the interim in the second partial volume 24 is therefore pressed out of the second partial volume 24 via fluid outlet 26 and is immediately available to the dispenser heads. Said movement of the working piston 54 also leads, via the endstop, to the sealing body 34 moving towards the open position. The liquid cold glue can now flow out again from the first partial volume 14 into the second partial volume 24.

The flow of cold glue from the second partial volume 24 to the dispenser heads that is stimulated by releasing the cold glue stored in cylindrical section 24a is maintained by the subsequent flow of cold glue from the first partial volume 14 into the second partial volume 24. Any cold glue that is subsequently required is then conveyed by the pump through fluid inlet 16.

Thus, by means of the pressure regulator 10 according to the invention, the operating pressure of liquid cold glue at the inlet of a dispensing head can be easily adjusted to a desired value. Interruptions and restarts of a material dispensing process can likewise be carried out in a simple and beneficial manner, and without unwanted peak pressures, using the pressure regulator according to the invention.

The invention claimed is:

1. An apparatus for regulating the pressure of fluid supplied to a dispenser, comprising:
    a housing having a fluid inlet and a fluid outlet, a first partial volume communicating with said fluid inlet, a valve seat defining at least a portion of said first partial volume, a second partial volume communicating with said fluid outlet, and a channel extending through said valve seat and communicating with said first and second partial volumes;
    a valve positioned in said housing and defining at least a portion of said first and second partial volumes, said valve being responsive to pressures within said second partial volume so as to move between an open and closed position within said first partial volume, wherein said valve includes a sealing surface adapted to contact said valve seat in said closed position so as to seal off said channel from said first partial volume;
    a piston having a piston disc defining at least a portion of said second partial volume and a piston rod extending through said channel and being axially movable relative to said valve, said piston rod adapted to engage said sealing surface of said valve so as to move therewith, said piston disc being coupled to said piston rod such that said second partial volume expands when said valve moves from said open position to said closed position; and
    a pneumatic actuator operatively coupled to said piston and being selectively movable from a first position wherein said piston rod engages said valve such that said valve is in said open position, to a second position wherein said piston rod is not engaged with said valve.

2. The apparatus of claim 1, wherein said second partial volume includes a cylindrical portion proximate said channel, an outlet portion proximate said fluid outlet, and an intermediate portion positioned between said cylindrical portion and said outlet portion, said cylindrical portion being at least partially defined by said piston disc and said outlet portion being at least partially defined by said valve.

3. The apparatus of claim 2, wherein said valve comprises:
    a sealing body positioned within said first partial volume opposite said valve seat;
    a base member retained within said housing and having a valve guide configured to support said sealing body, said valve guide being exposed to said outlet portion of said second partial volume.

4. The apparatus of claim 3, wherein said valve further comprises a valve spring positioned between said base member and said sealing body such that said valve is biased towards said closed position.

5. The apparatus of claim 1, wherein said valve is biased in said closed position.

6. The apparatus of claim 1, further comprising:
a ceramic insert received in said housing and defining said valve seat, said channel extending through said ceramic insert.

7. The apparatus of claim 1, wherein said housing further includes a cylinder for receiving said piston, said piston disc further including a lip seal adapted to form a seal between said piston disk and said cylinder.

8. The apparatus of claim 7, further comprising:
a cover member coupled to said housing over said cylinder, said cover member having a bore for accommodating said piston.

9. The apparatus of claim 8, wherein said cover member further includes an opening, a protective cover removably positioned over said opening, and a passage extending from said opening into said cylinder.

10. The apparatus of claim 8, wherein said piston has a top portion extending through said bore, the apparatus further comprising:
an indicator member coupled to said top portion of said piston.

11. The apparatus of claim 9, wherein said indicator member is a screw.

12. An apparatus for regulating the pressure of fluid supplied to a dispenser, comprising:
a regulator, comprising:
a housing having a fluid inlet and a fluid outlet, a first partial volume communicating with said fluid inlet, a valve seat defining at least a portion of said first partial volume, a second partial volume communicating with said fluid outlet, and a channel extending through said valve seat and communicating with said first and second partial volumes;
a valve positioned in said housing and defining at least a portion of said first and second partial volumes, said valve being responsive to pressures within said second partial volume so as to move between an open and closed position within said first partial volume, wherein said valve includes a sealing surface adapted to contact said valve seat in said closed position so as to seal off said channel from said first partial volume; and
a regulator piston having a piston disc defining at least a portion of said second partial volume and a piston rod extending through said channel, said piston rod adapted to engage said sealing surface of said valve so as to move therewith, said piston disc being coupled to said piston rod such that said second partial volume expands when said valve moves from said open position to said closed position; and
an adjustor adapted to apply force to said regulator piston, said adjustor comprising:
a housing positioned above said regulator and having an open bottom, a base coupled to said open bottom so as to define a chamber within said housing, and an inlet communicating with said chamber for supplying pressurized gas thereto; and
an adjustor piston having a head portion within said chamber and a rod portion extending through said base, said rod portion adapted to engage said regulator piston such that when a sufficient amount of pressurized gas is supplied to said chamber said adjustor piston causes said valve to move from said closed position into said open position.

13. The apparatus of claim 12, wherein said adjustor further comprises a spring member positioned between said base of said housing and said head portion of said adjustor piston such that said adjustor piston is biased within said chamber.

14. The apparatus of claim 12, wherein said second partial volume of said regulator includes a cylindrical portion proximate said channel, an outlet portion proximate said fluid outlet, and an intermediate portion positioned between said cylindrical portion and said outlet portion, said cylindrical portion being at least partially defined by said piston disc and said outlet portion being at least partially defined by said valve.

15. The apparatus of claim 14, wherein said valve comprises:
a sealing body positioned within said first partial volume opposite said valve seat;
a base member retained within said housing and having a valve guide configured to support said sealing body, said valve guide being exposed to said outlet portion of said second partial volume.

16. The apparatus of claim 15, wherein said valve further comprises a valve spring positioned between said base member and said sealing body such that said valve is biased towards said closed position.

17. The apparatus of claim 12, wherein said regulator further comprises a ceramic insert received in said housing and defining said valve seat, said channel extending through said ceramic insert.

18. The apparatus of claim 12, wherein said housing of said regulator further includes a cylinder for receiving said regulator piston, said piston disc further including a lip seal adapted to form a seal between said piston disk and said cylinder.

19. The apparatus of claim 18, wherein said regulator further comprises a cover member coupled to said housing over said cylinder, said cover member having a bore for accommodating said regulator piston.

20. An apparatus for regulating the pressure of fluid supplied to a dispenser, comprising:
a housing having a fluid inlet and a fluid outlet, a first partial volume communicating with said fluid inlet, a valve seat defining at least a portion of said first partial volume, a second partial volume communicating with said fluid outlet, and a channel extending through said valve seat and communicating with said first and second partial volumes;
a first piston movable within said first partial volume between an open position in which said first piston is spaced from said valve seat and a closed position in which said first piston contacts said valve seat to seal off said channel from said first partial volume;
a second piston having a piston disc defining at least a portion of said second partial volume and a piston rod configured to extend through said channel and engage said first piston, said piston rod being movable with said first piston when said first piston moves between said open and closed positions but independently axially movable relative to said first piston when said first piston is in said closed position, said piston disc being coupled to said piston rod such that said second partial volume increases or decreases when said piston rod moves; and
a pneumatic actuator operatively coupled to said second piston and being selectively movable from a first position wherein said piston rod engages said first piston such that said first piston is in said open position, to a second position wherein said piston rod is not engaged with said first piston.

* * * * *